Oct. 23, 1928.  
O. WITTEL  
1,688,370  
LENS ATTACHMENT FOR PHOTOGRAPHIC APPARATUS  
Filed Jan. 11, 1928  4 Sheets-Sheet 1
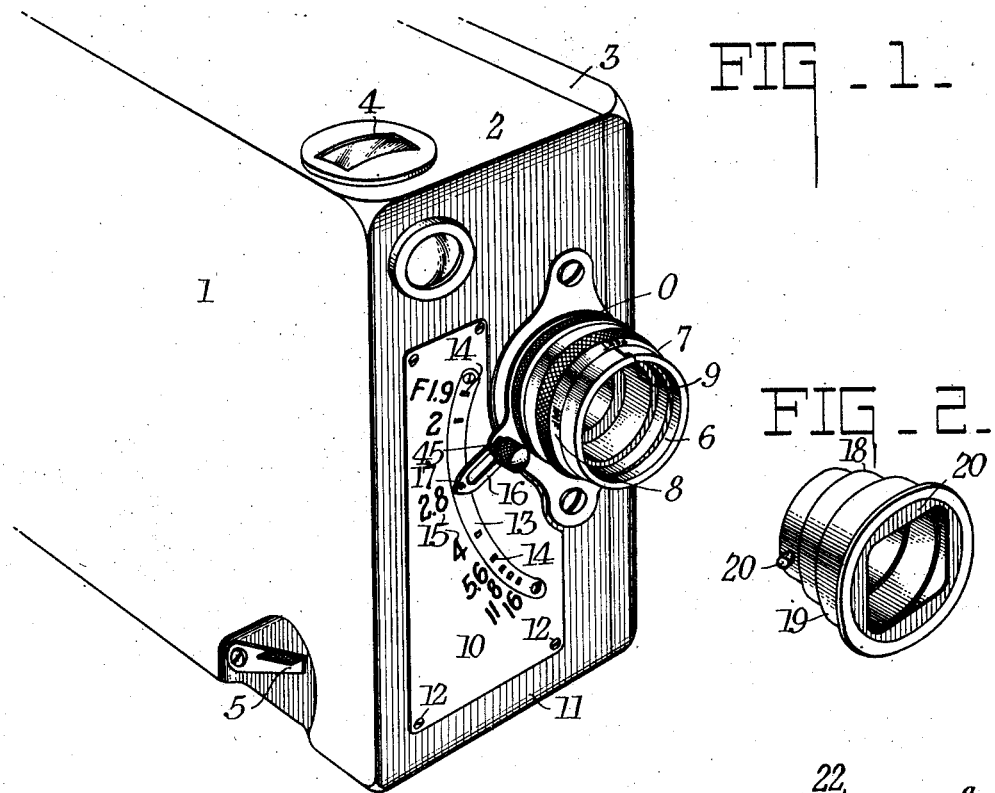
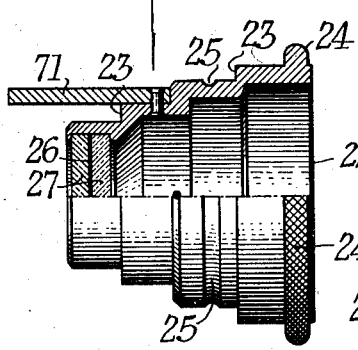
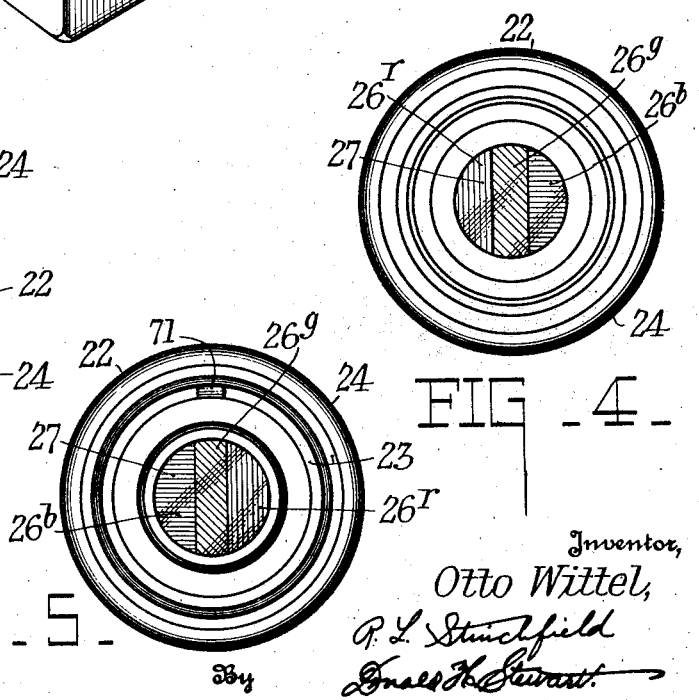
Inventor,  
Otto Wittel,  
By  
Attorneys Oct. 23, 1928.  1,688,370
O. WITTEL
LENS ATTACHMENT FOR PHOTOGRAPHIC APPARATUS
Filed Jan. 11, 1928  4 Sheets-Sheet 2
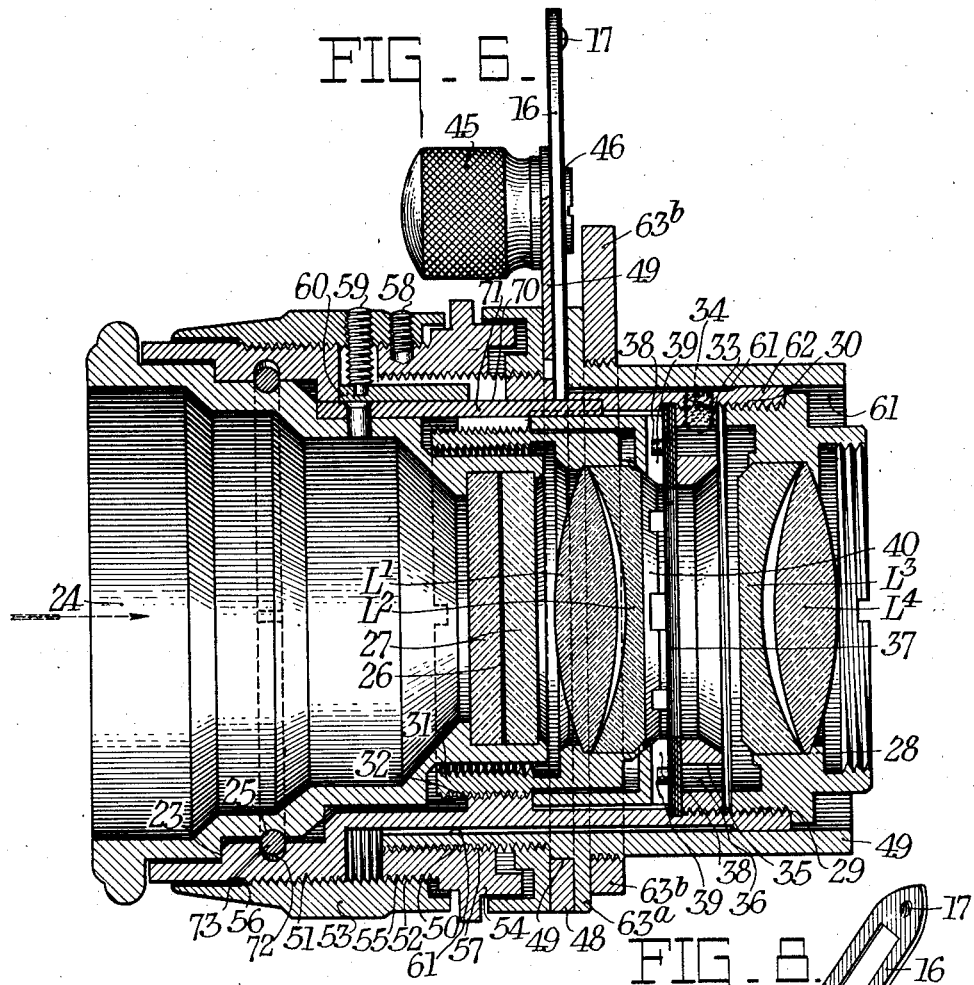
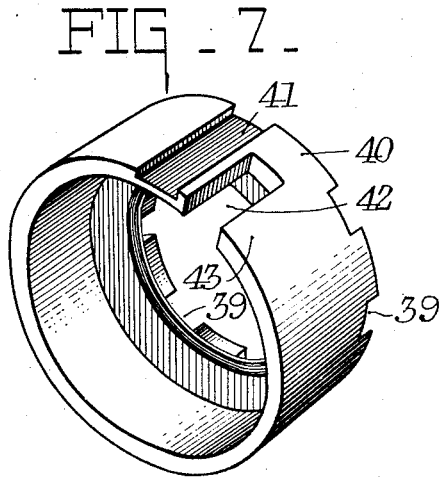
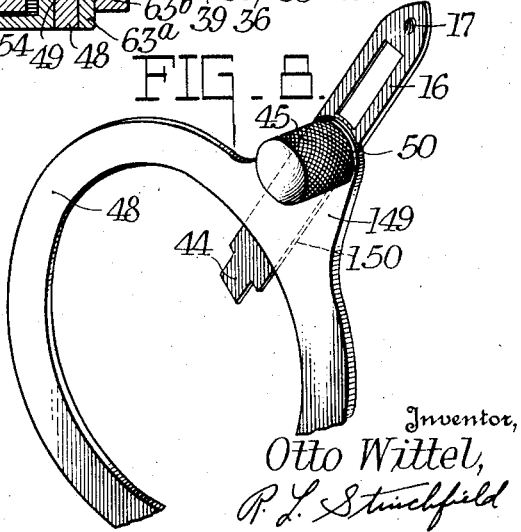
Inventor,
Otto Wittel, Oct. 23, 1928.
O. WITTEL
1,688,370
LENS ATTACHMENT FOR PHOTOGRAPHIC APPARATUS
Filed Jan. 11, 1928    4 Sheets-Sheet 3
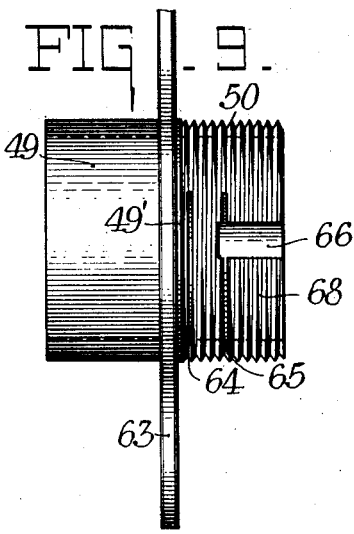
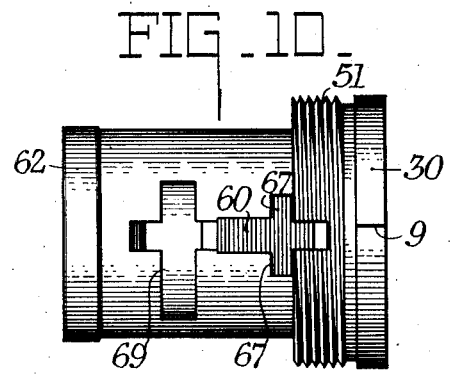
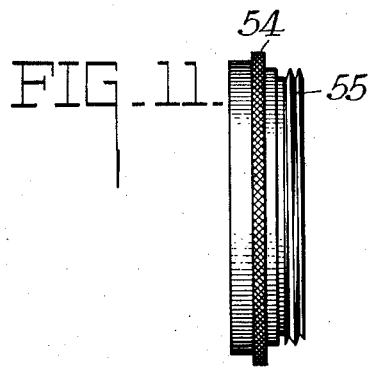
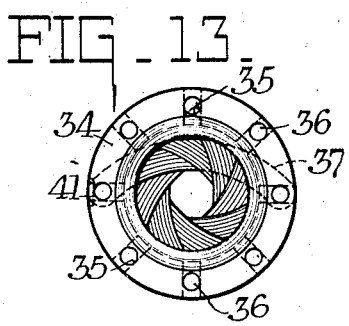
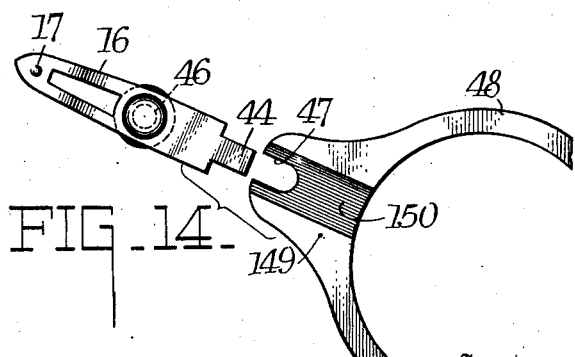
Inventor,
Otto Wittel,

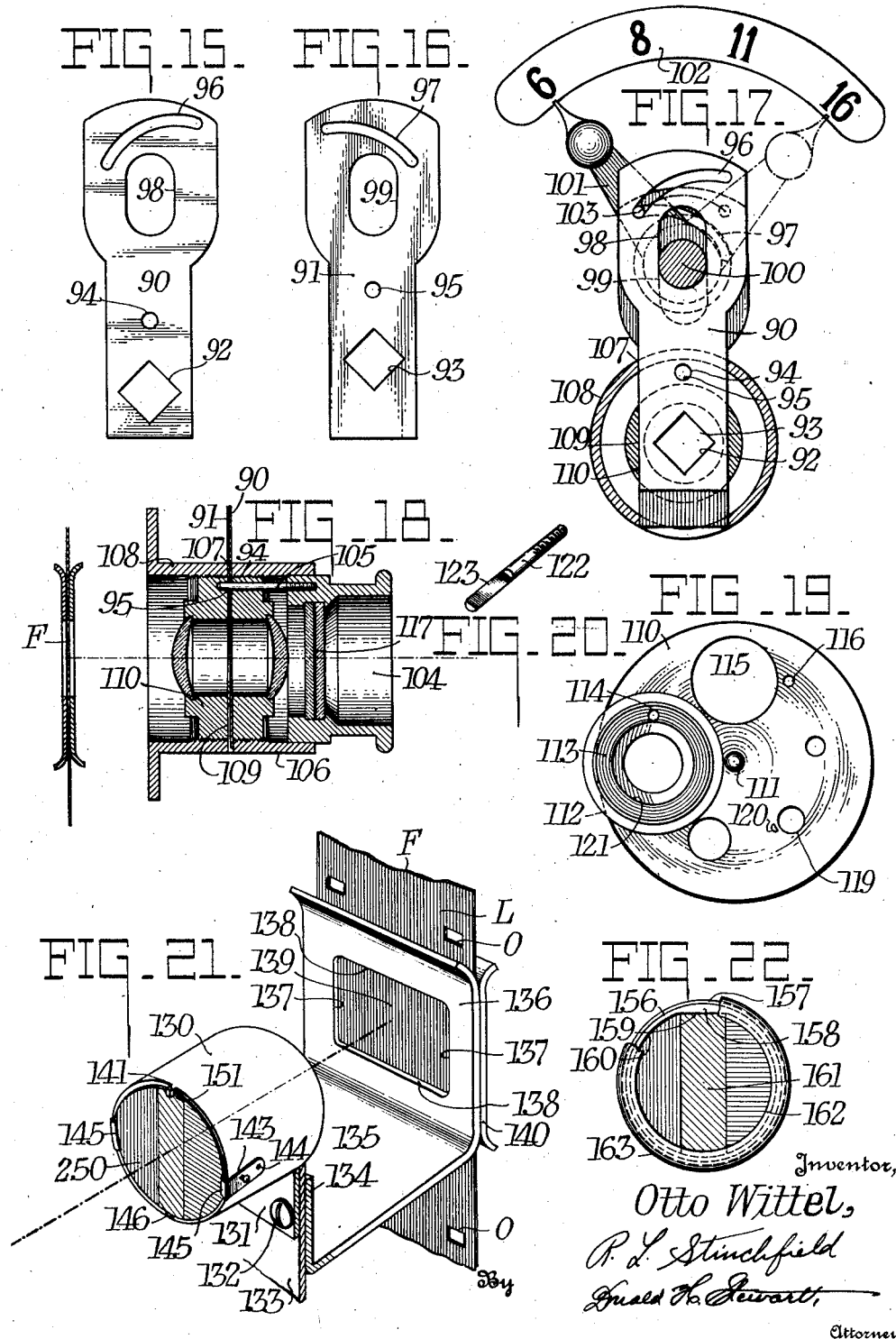

Patented Oct. 23, 1928.

1,688,370

UNITED STATES PATENT OFFICE.

OTTO WITTEL, OF ROCHESTER, NEW YORK, ASSIGNOR TO EASTMAN KODAK COMPANY, OF ROCHESTER, NEW YORK, A CORPORATION OF NEW YORK.

LENS ATTACHMENT FOR PHOTOGRAPHIC APPARATUS.

Application filed January 11, 1928. Serial No. 245,904.

This invention relates to cameras and more particularly to optical equipment for photographic apparatus. One object of my invention is to provide a lens mount and diaphragm in which the diaphragm must be placed at a predetermined setting before a filter or color screen may be placed on the mount. Another object is to provide a suitable automatically actuated latch for holding a lens attachment in position. Another object is to provide a mount upon which an attachment may be placed in only one fixed position. Another object is to provide a diaphragm and lens attachment with cooperating parts which permit a special attachment to be placed on the lens mount only when the diaphragm opening is suitable for the particular attachment. Still another object is to provide a suitable means for registering a banded filter in a definite predetermined relation to the film gate of the camera upon which the filter is to be used, and other objects will appear hereinafter from the following specification, the novel features being pointed out in the claims at the end thereof.

In cameras, and particularly in motion picture cameras it is often useful to use a certain lens attachment at a certain diaphragm opening. For instance, in color photography, a special filter may be required which will necessitate, for proper exposure, the use of as large a diaphragm opening as possible; and when such is the case, the use of a smaller stop would result in failure. In certain types of color photography a filter including a plurality of bands of color filter members may be used. These bands may have to bear a predetermined relation to a special type of film which is exposed in the focal plane of the camera at the film gate. It is, therefore, necessary to provide registering devices which will make it necessary to properly position the banded filter before the same can be positioned on the camera to insure that the filter bands are in the desired position with respect to the film gate. As another example, a telephoto attachment may be used successfully only with a relatively small stop. By providing cooperating parts between the attachment and diaphragm, I automatically permit the use of an attachment only for the diaphragm setting at which the best results are obtainable. To this end a special diaphragm has been constructed which will be hereinafter fully described.

The mechanism for focusing the objective mount, as shown and described in this specification, is the subject matter of a separate application for focusing objective mount for cameras, Serial No. 189,132 filed May 5, 1927, from which application most of the subject matter of the present application has been divided out.

Coming now to the drawings wherein like reference characters denote like parts throughout.

Fig. 1 is a perspective view showing one form of an optical equipment for cameras constructed in accordance with and illustrating a preferred form of my invention;

Fig. 2 is a perspective view of an attachment adapted to be used in connection with the objective mount;

Fig. 3 is a part side elevation and part section through a filter attachment adapted to be used with my lens mount;

Fig. 4 is a front elevation of the attachment shown in Fig. 3;

Fig. 5 is a rear elevation of the same attachment;

Fig. 6 is a section through a preferred embodiment of the optical equipment for cameras shown in Fig. 1;

Fig. 7 is a perspective view of the diaphragm moving member;

Fig. 8 is a perspective view of the diaphragm adjusting ring and the diaphragm adjusting lever;

Fig. 9 is a side elevation of the lens tube support;

Fig. 10 is a similar view of the lens tube;

Figs. 11 and 12 are side elevations of the two parts which form the focusing ring for the objective;

Fig. 13 is a front plan view of the diaphragm;

Fig. 14 is a rear plan view of the diaphragm adjusting lever;

Figs. 15 and 16 are plan views of diaphragm plates constructed in accordance with a second embodiment of my invention;

Fig. 17 is a part front elevation of a diaphragm constructed from the plates shown in Figs. 15 and 16;

Fig. 18 is a section through a lens mount equipped with the diaphragm shown in Fig. 17;

Fig. 19 is a front elevation of a diaphragm constructed in accordance with still another embodiment of my invention;

Fig. 20 is another type of diaphragm locating arm;

Fig. 21 is a perspective fragmentary view showing a projector objective and a relatively fixed film gate equipped with the filter registering device; and Fig. 22 is a front plan view of another embodiment of my invention for registering banded filters with respect to the film gate in either projectors or cameras.

As shown in Fig. 1, my optical equipment for cameras designated broadly by 0 is shown as mounted upon a camera 1, which is of a well known type of motion picture camera. This camera may comprise a body portion 2 having a removable side 3 for loading the camera, a finder 4 and a trigger 5, by which the power spring (not shown) may be operated to take motion pictures.

The optical equipment includes the objective, the focusing structure, the diaphragm structure, and the lens attachments such as are commonly used with cameras of this type.

In Fig. 1 an objective is contained in the barrel 6, and this may be focused by turning a focusing ring 7, which bears on its periphery a scale 8 which may be brought opposite a locating line 9 to adjust the objective to the desired focal distance.

The diaphragm scale plate 10 may be fastened to the front 11 of the camera, in any suitable way as by screws 12. This scale plate is preferably provided with an arcuate path 13 provided with a series of cutouts 14 opposite the different diaphragm opening designating numerals 15. The diaphragm adjusting lever 16 is provided with a protuberance 17 adapted to snap in and be frictionally held by these cutouts.

In Fig. 2, the lens attachment is known as a sky shade, this consisting of a barrel 18 which may have a series of offset shoulders 19, so as to fit into the objective mount to be hereinafter more fully described. There is a light baffle plate 20 mounted in the front end of the barrel 18 and an attachment locating pin 21 on the rear portion of the barrel. By engaging a groove to be hereinafter described, the location of the baffle plate 20 with respect to the objective will be controlled.

In Figs. 3, 4, 5, the lens attachment is a color filter for use in color photography. This color filter consists of a barrel portion 22 having a series of offset shoulders 23 to fit into the objective mount and having a knurled outer edge 24 by which it may be conveniently placed on the mount. Groove 25 extends between two of the offset shoulders 23 and the filter element is here shown at 26 as being positioned between two clear glass plates 27. The filter shown in this embodiment of my invention consists of three color sections $26^r$ which is red, $26^g$ which is green, and $26^b$ which is blue. These filter bands, are preferably separated by narrow black bands, so that all light passing through the filter will be colored by the filter elements.

Referring to Fig. 6, the structure of the objective mount is as follows: The objective comprises four lenses $L^1$, $L^2$, $L^3$, and $L^4$. The two last mentioned lenses are contained in a lens cell 28 which has a threaded connection 29 with the objective mount 30. Lenses $L^1$ and $L^2$ are carried by lens cell 31 having a threaded connection 32 with the objective mount 30. These lens cells are held in a fixed position.

The diaphragm consists of a fixed diaphragm ring 33, which is attached by screw 34 to the objective mount 30. This ring includes a series of aperatures 35 (see Fig. 13) which support pins 36 extending rearwardly from the diaphragm leaves 37. Each diaphragm leaf has a second pin 38 extending in an opposite direction into a slot 39 of movable diaphragm cell 40 as shown in Fig. 6. The diaphragm structure above described is well known in the art.

Referring to Fig. 7 which shows the movable diaphragm cell 40, this cell is mounted to turn in the objective mount 30. Cell 40 is provided with a groove 41 which extends across the cell and a slot 42 which extends through a portion of the flange 43 of the cell. In order to turn member 40, there is a diaphragm operating lever 16 having an end 44 which passes into the slot 42. Member 16 is provided with an operating handle 45, this handle being in the form of a knurled nut which is attached to a screw 46, as best shown in Fig. 14 and is adapted by engaging the slot 47 to attach the operatiing lever 16 to a ring 48 which encircles the support 30 on shoulder 49, as best shown in Fig. 6. The ring 48 is provided with an offset 149 grooved at 150 to receive the operating lever 16, the groove 150 being of the same depth as the thickness of the metal from which the operating lever 16 is made. In other words, as shown in Fig. 8, when the operating lever is assembled, the outer surface will lie flush with the surface of the ring 48.

When the objective is focused by moving the objective mount 30 relative to the support 49 as will be hereinafter more fully described, the diaphragm structure will, of course, also move. Since the diaphragm operating lever 16 and the ring 48 are mounted on the support, this structure will not move with the diaphragm. Lever 44, by projecting into slot 42, permits the relative sliding movement between the diaphragm and its operating lever. This structure is useful, because it permits the lever 16 to have a fixed relation with the scale plate 10 and permits it to be arranged so that the protuberance 17 will always be in frictional engagement with the scale plate, so that it may snap into the cutouts 13.

In order to move the objective mount 30 with respect to the support 49, I have provided two threaded areas 50 and 51, these threads being right and left hand. Thread 50 forms a part of the support 49. Thread 51 forms a part of the objective mount 30. A focusing ring designated as 52 is made of two parts 53 and 54, which, as best shown in Fig. 6, are connected by screw thread 55. This focusing ring is provided with two threaded areas 56 and 57, one thread being right hand and the other left hand, the two threads engaging the threads 50 and 51. The lens is initially adjusted by turning the two sections of the focusing ring relative to each other, after which they are fastened together by a set screw 58. When so fastened they move as a unit, and, as the focusing ring is turned, the objective is moved with respect to its support. A screw 59 extends downwardly into the path of a key 60 carried by the objective carrier 30, so that more than one revolution of the focusing ring is thus prevented.

As best shown in Figs. 9 and 10, the structure of the focusing mechanism is as follows: In Fig. 9 the support 49 is shown as consisting of a barrel shaped member having a smooth inside bore 61 adapted to receive the slide pad 62 of the objective carrier 30. Member 49 in the form shown in Fig. 9 is provided with a flange 63 which may be attached to the camera wall 1. In the embodiment shown in Fig. 6, this flange, for convenience, is divided into two parts 63ª and 63ᵇ, these being threaded together and 63ᵇ being permanently attached to the camera wall. This facilitaties removing the optical unit.

The threaded portion 50 of member 49 is slotted at 64 and at 65, these slots being preferably parallel and the latter slot intersecting a third slot 66. Slot 66 provides an opening which the web 60 on member 30 may engage, so that the objective carrier may freely slide but may not turn with respect to the support 49. The shoulders 67 of the web 60 limit the inward motion of member 30 with respect to the support 49.

Slot 64 is provided so that the diaphragm lever operating extension 44 may turn axially with respect to the support, this slot being normally covered by the ring 48. Slot 65 permits an area 68 of the thread 50 to be sprung outwardly to create a tension on the focusing ring 52, so that it may remain in any set position.

Referring to Fig. 10, the objective carrier is provided with a slot 69 which is of sufficient length to permit the rotative movement of the diaphragm lever 16 necessary to adjust the diaphragm to different openings.

As shown in Fig. 6, a groove 70 is formed in the objective mount 30, this groove being formed in the smooth inside bore 61. When the groove 41 of the movable diaphragm member registers with the groove 70 of the objective mount, an attachment locating arm 71 may pass into the slot thus formed. Obviously, when the slots 41 and 70 are in registration, the diaphragm opening is at a predetermined setting. In Fig. 5, I have shown this setting to be fully open, as, with the color filter 24 in the place, this is necessary.

It should be noted here that since the locating arm 71 bears a fixed relation to the filter color bands 26ʳ, 26ᵍ, 26ᵇ, and since this arm definitely locates the filter with respect to the objective mount, the filter bands are always in a predetermined position with respect to the film gate, this being necessary for certain types of color film.

There is a groove 72 on the inside of the objective carrier and in this groove there is a split ring 73, this ring serving as a snap latch to hold a lens attachment 24 in place by snapping into a groove 25 in the attachment. Unless the arm 71 passes into the opening formed in the grooves 41—70, the split ring cannot engage in groove 24, so that the lens attachment cannot be placed in front of the objective. This makes it necessary to properly adjust the diaphragm before the attahcment can be properly located.

In another embodiment of my invention shown in Figs. 15 to 18 inclusive, a simpler type of lens attachment and diaphragm structure is illustrated. The diaphragm is of the "cat's eye" type and comprises two similarly shaped plates 90 and 91. Each has a square diaphragm opening 92 in plate 90 and 93 in plate 91 and each has an aperture 94 in plate 90 and 95 in plate 91 spaced from the diaphragm opening. Cam slots 96 and 97 are provided in the tops of plates 90 and 91 and centrally cut out portions 98 and 99 are provided in plates 90 and 91 to slide upon a post 100 which supports the adjusting lever 101 movable over a scale 102 and which is provided with a pin 103 which passes through the cam slots 96 and 97. When the lever is moved, the pin passing through the cam slots moves the plates with respect to each other and thus alters the diaphragm aperture. In one position of the plates as shown in Fig. 17, the apertures 94 and 95 are in registration and in this position a lens attachment 104 having a pin 105 may be placed on the lens mount 106, the pin 105 passing through the registering apertures 94 and 95. The diaphragm plates 90 and 91 pass through slots 107 in the lens barrel 108 and slot 109 in the lens cell 110.

In the embodiment of my invention described in the preceding paragraph, like that shown in the first described embodiment of my invention, the locating pin 105 fixes the relation of the filter members with respect to the films F shown in the gate in Fig. 18.

It is not necessary, of course, that the lens attachment be placed on the camera with only the largest diaphragm in place. If desired, any diaphragm opening may be provided with a part adapted to cooperate with a lens attachment so that the lens attachment may be used at only one diaphragm opening. For instance, as shown in the embodiment in Fig. 19, a diaphragm may consist of a plate 110 adapted to turn upon a stud 111 through an opening 112 in a lens mount 113, the lens mount being provided with an aperture 114. In this embodiment, when aperture 115 of the diaphragm is in position, a small aperture 116 near the diaphragm may register with aperture 114 so that a lens attachment similar to 104 provided with a pin 105 may be seated in the lens mount when the pin passes through the registering apertures 114 and 116.

In Fig. 21 I have shown still another embodiment of my invention, which is particularly adapted for use with inexpensive natural color photographic apparatus, such as cameras or projectors. The objective 130 may be mounted upon a plate 131 attached by screws 132 to a supporting wall 133. A flange 134 is likewise attached to the supporting wall, and from this flange there extends rearwardly a plate 135, which is formed up at 136 to form a film gate. This gate has an opening 139 formed by two side edges 137 and top and bottom edges 138, there being a presser member 140 which holds the film F flat in the focal plane of the objective 130. In this embodiment I have shown the film F to be of a special type bearing a series of minute lenticular elements L, these elements running parallel or substantially so to the edges 137 of the film gate. The film may be provided with the usual perforations 0, and the emulsion side which constitutes the light sensitive side before development and the image bearing side after developement, faces away from the objective.

The filter elements 250 may consist of a suitably colored piece of glass or pyroxylin, the color elements being arranged in bands $26^r$, $26^g$, and $26^b$, and this filter element may be registered with respect to the film gate by means of the notch 151, which may be engaged, and lug 141 on the objective mount. The filter member 250 may rest upon a lug 146, and may be held in place by the latch members 145 which are formed on the ends of spring members 143 which may be attached to the objective mount 130 at 144. Thus the filter may only be placed in position when the notch 151 is in registration with the lug 141, and in this position the filter bands bear a predetermined relation to the film gate 139 so that the color bands will be properly located with respect to the minute lenticular elements L of the film.

Another embodiment of my invention shown in Fig. 22 consists of the filter element 161 similar to filter 250 except that this element is provided with a substantially circular periphery 160 having a flat portion 159 adapted to engage a flat portion 158 of the objective mount 156. The objective mount is preferably threaded at 157, and there is an annular member 163 adapted to screw on the thread 157, so that when seated upon the objective mount the flange 162 of the annular member rests against and holds the filter element 161 upon the front of the objective mount.

In this form the filter element 161 has an irregular portion 159 which is complementary to the irregular portion 158 of the mount. This permits the filter to be placed on the mount in only one position, and since this position has been arranged to bear a predetermined relation to the film gate, the film bands will be automatically retained in the proper position.

If the lens attachment in place of the color filter shown at 117 should be provided with a "telephoto lens", that is, a weak negative lens, it would be useful only when a relatively small lens aperture is used. Accordingly, aperture 119 (Fig. 19) is provided with an opening 120 which may lie inside of the opening 121 in the lens cell and which may be engaged by pin 122 having an end 123 of complementary shape. Thus the telephoto attachment could be used only when diaphragm opening 119 is in place before the lens. The lens attachment may, therefore, have a projection or protuberance which deforms or distorts the normal symmetrical shape of the attachment, and, as these projections may be made of different shapes, a series of attachments may be provided for a single objective carrier, so that only one attachment may be used at a predetermined setting of the diaphragm.

Throughout the specification and in the claims where the term "photographic apparatus" is used, I intend it to be used in its broadest sense to designate either cameras or projectors for motion or still pictures which employ objectives, film gates, and lens attachments for apparatus in which a support carrying a photographic light sensitive emulsion is used or where a support carrying images developed from such an emulsion is employed.

Having thus described my invention, what I claim as new and desire to secure by Letters Patent is:

1. In photographic apparatus, the combination with a mount including an adjustable diaphragm, of an attachment adapted to engage the mount, and means on the attachment adapted to engage the diaphragm to prevent adjustment thereof.

2. In photographic apparatus, the combination with a mount including a diaphragm with an opening, of a movable member by which the size of the diaphragm opening may be altered, an attachment for the objective, and means on the attachment adapted to engage the movable member only when the diaphragm opening is of a certain predetermined size.

3. In photographic apparatus, the combination with a mount including an adjustable diaphragm, of an attachment for the mount and means movable with the adjustable diaphragm permitting the application of the attachment to the mount only when the diaphragm is at a predetermined setting.

4. In photographic apparatus, the combination of a mount including fixed parts and an adjustable diaphragm, there being guideways through certain fixed parts of the mount and the diaphragm, the guideways being in alignment when the diaphragm is at a predetermined setting, an attachment for the mount, a projection on the attachment adapted to engage the guideways in the mount and diaphragm when these are in alignment whereby these parts may be definitely located with respect to each other.

5. In photographic apparatus, the combination of a mount including fixed parts and an adjustable diaphragm, there being guideways through certain fixed parts of the mount and the diaphragm, the guideways being in alignment when the diaphragm is at a predetermined setting, an attachment for the mount, a projection on the attachment of a size and shape to fit the guideways when these are in alignment whereby the attachment may be placed on the mount when the guideways are positioned at a predetermined setting.

6. In photographic apparatus, the combination with a grooved mount, of an adjustable diaphragm adapted normally to close the groove but having a definite position in which the groove is not closed, and attachment for the mount including a groove engaging member adapted to be seated on the mount only when the diaphragm is in said definite position whereby the groove engaging member may enter the groove.

7. In photographic apparatus, in combination, an objective mount, a diaphragm carried by the mount and having an opening therein, a filter attachment for the mount including a plurality of filters arranged in definite relation in the attachment, an arm carried by the attachment in a fixed relation to the filter elements, said arm being adapted to engage the diaphragm opening and thus position the filter elements relative to the diaphragm.

8. In photographic apparatus, in combination, an objective mount, a diaphragm carried by the mount and having an opening therein, said opening being exposed when the diaphragm is placed at a predetermined setting, a filter attachment including a plurality of filter elements and a projection adapted to enter the diaphragm opening only when the diaphragm is at said setting, said cooperating diaphragm opening and protuberance insuring the proper diaphragm opening and the proper relation of the filter elements to the diaphragm.

9. In photographic apparatus, the combination of a mount having a diaphragm, an attachment for the mount, means on the mount adapted to position an attachment with respect to the mount, and means under control of the diaphragm for preventing the positioning of the attachment.

10. In photographic apparatus, the combination with a support, an objective mount movably mounted thereon, a diaphragm carried by the mount, a diaphragm adjusting member mounted to turn in a plane fixed relative to the support, an attachment for the objective mount, and an engaging member carried by the attachment adapted to extend into the path of the diaphragm adjusting member.

11. In photographic apparatus, the combination with a support, of an objective mount carried thereby, an adjustable diaphragm mechanism carried by the mount and including a movable member adapted to alter the diaphragm opening and an attachment for the objective, parts of the objective attachment and movable member cooperating to permit the attachment to be placed on the objective mount when the movable member is in a predetermined position.

12. In photographic apparatus, the combination with a support, of an objective mount carried thereby, an adjustable diaphragm mechanism carried by the mount and including a movable member adapted to alter the diaphragm opening and an attachment for the objective, said movable member being formed to prevent the attachment from being placed on the objective mount when the movable member is in certain positions.

13. In photographic apparatus, the combination with a support, an objective mount carried thereby, diaphragm mechanism adapted to be positioned in the objective mount, said diaphragm mechanism including at least one movable part having an opening therein, and objective attachment having a protuberance thereon, said protuberance being adapted to engage said opening to position the attachment on the mount.

14. In photographic apparatus, the combination with a support, an objective mount carried thereby, diaphragm mechanism adapted to be positioned in the objective mount, said diaphragm mechanism including at least one movable part having an opening therein, a snap latch on the mount, an objective attachment including a protuberance adapted to engage the opening when the parts have a definite relation, said protuberance by entering the opening permitting the snap latch to engage and hold the attachment on the mount in such relation.

15. In photographic apparatus, the combination with a support, an objective mount carried thereby, diaphragm mechanism adapted to be positioned in the objective mount, said diaphragm mechanism including at least one movable part, an objective attachment for the objective mount, and means controlled by the movable diaphragm part to prevent the attachment from being seated on the mount.

16. In photographic apparatus, the combination with a support, an objective mount carried thereby, diaphragm mechanism adapted to be positioned in the objective mount, said diaphragm mechanism including at least one movable part, said part being movable to a plurality of positions for determining the size of the diaphragm opening in the objective mount, and an attachment for the objective adapted to be seated on the objective mount, a member carried by said attachment cooperating with said part and lens mount whereby the position of the movable part controls the positioning of the attachment on the objective mount.

17. In photographic apparatus, the combination with a support, on objective mount carried thereby, diaphragm mechanism adapted to be positioned in the objective mount, said diaphragm mechanism including at least one movable part, a latching device on the mount, an attachment adapted to cooperate with the latching device and the movable part of the diaphragm in a predetermined position, thus forming a connecting member between the latch and movable diaphragm part, the position of said movable part controlling the latching of the attachment to the mount.

18. In photographic apparatus, the combination of a support, a film gate carried by the support, an objective carried by the support, a filter adapted for use with the objective, said filter comprising a plurality of areas adapted to transmit light rays of different characteristics, and means for definitely locating the filter areas with respect to said film gate.

19. In photographic apparatus, the combination of a support, a film gate carried by the support, an objective carried by the support, a filter adapted for use with the objective, said filter comprising a plurality of areas adapted to transmit light rays of different characteristics, and means for definitely locating the filter areas with respect to said film gate, said means including a locating member fixed with respect to the support.

20. In photographic apparatus, the combination of a support, a film gate carried by the support, an objective carried by the support, a filter adapted for use with the objective, said filter comprising a plurality of areas adapted to transmit light rays of different characteristics, and means for definitely locating the filter areas with respect to said film gate, said means including a pair of complementary members, one carried by the filter and the other carried by the support.

21. In combination, an objective, a polychromic filter associated with said objective and adapted to be used with a photographic element in the rear focal plane of the objective, the photographic element comprising an image layer and a series of microscopic, image-forming elements between the layer and the objective filter, said objective filter comprising a series of colored light transmitting areas arranged in a pattern, and means for definitely locating the filter with respect to the microscopic image-forming elements of the photographic element.

22. In combination, an objective, a polychromic filter associated with said objective and adapted to be used with a photographic element in the rear focal plane of the objective, the photographic element comprising an image layer and a series of microscopic, image-forming elements between the layer and the objective filter, said objective filter comprising a series of colored light transmitting areas arranged in a pattern, and means for definitely locating the filter with respect to the microscopic image-forming elements of the photographic element, including a fixed member, and a member carried by the filter adapted to engage the fixed member.

23. In combination, an objective, a polychromic filter associated with said objective and adapted to be used with a photographic element in the rear focal plane of the objective, the photographic element comprising an image layer and a series of microscopic, image-forming elements between the layer and the objective filter, said objective filter comprising a series of colored light transmitting areas arranged in a pattern, and means for definitely locating the filter with respect to the microscopic image-forming elements of the photographic element.

24. In combination, an objective, a polychromic filter associated with said objective and adapted to be used with a photographic element in the rear focal plane of the objective, the photographic element comprising an image layer and a series of microscopic, lineal, parallel image-forming elements between the layer and the objective filter, said filter comprising a series of colored light transmitting areas arranged in parallel relation, and means for definitely locating the filter with respect to the microscopic lineal image-forming elements of the photographic element.

Signed at Rochester, New York, this 6th day of January, 1928.

OTTO WITTEL.